(12) United States Patent
Wang et al.

(10) Patent No.: US 11,214,253 B2
(45) Date of Patent: Jan. 4, 2022

(54) LONGITUDINAL MOTION CONTROL OF CONNECTED AND AUTOMATED VEHICLES

(71) Applicant: TOYOTA JIDOSHA KABUSHIKI KAISHA, Toyota (JP)

(72) Inventors: Ziran Wang, Mountain View, CA (US); Hiromitsu Kobayashi, Toyota (JP); Kyungtae Han, Mountain View, CA (US); BaekGyu Kim, Mountain View, CA (US)

(*) Notice: Subject to any disclaimer, the term of this patent is extended or adjusted under 35 U.S.C. 154(b) by 218 days.

(21) Appl. No.: 16/422,657

(22) Filed: May 24, 2019

(65) Prior Publication Data
US 2020/0369273 A1 Nov. 26, 2020

(51) Int. Cl.
*B60W 30/14* (2006.01)
*B60W 30/16* (2020.01)
*B60W 50/00* (2006.01)

(52) U.S. Cl.
CPC .......... *B60W 30/146* (2013.01); *B60W 30/16* (2013.01); *B60W 2050/0026* (2013.01)

(58) Field of Classification Search
CPC ............... B60W 30/146; B60W 30/16; B60W 2050/0026; G08G 1/22
See application file for complete search history.

(56) References Cited

U.S. PATENT DOCUMENTS

2019/0243371 A1* 8/2019 Nister .................. G05D 1/0231
2019/0258251 A1* 8/2019 Ditty .................. G06K 9/00805

* cited by examiner

*Primary Examiner* — Brian P Sweeney
(74) *Attorney, Agent, or Firm* — Burbage Law, P.C.; Jon-Michael Burbage; Elizabeth Ruzich

(57) ABSTRACT

The disclosure includes embodiments for providing a lookup table to improve performance of a consensus mechanism used in Connected and Automated Vehicle (CAV) technologies. In some embodiments, a method for a connected vehicle includes building a lookup table that is populated with control gain values for a consensus mechanism. The control gain values are created based on a satisfaction of one or more driving constraints by the consensus mechanism. The method includes receiving data describing an initial vehicle state related to a flow of vehicles. The method includes searching the lookup table for a set of control gain values based on the initial vehicle state. The method includes implementing the consensus mechanism on the flow of vehicles based on the set of control gain values so that behavior of the flow of vehicles is coordinated.

20 Claims, 10 Drawing Sheets

400 

Flowchart: build a lookup table offline

```
Input:  Π_{Δr_ij} = {Δr_{ij_1}, Δr_{ij_2}, ..., Δr_{ij_ζ1}},  Π_{v_i} = {v_{i_1}, v_{i_2}, ..., v_{i_ζ2}},
        Π_{v_j} = {v_{j_1}, v_{j_2}, ..., v_{j_ζ3}},  Π_γ = {v_{γ_1}, v_{γ_2}, ..., v_{γ_ζ4}},  Π_k =
        {v_{k_1}, v_{k_2}, ..., v_{k_ζ5}},  ζ1 = |Π_{Δr_ij}|,  ζ2 = |Π_{v_i}|,  ζ3 = |Π_{v_j}|
Output: 3-dimension table with size ζ1 × ζ2 × ζ3
00:  for ξ1 ∈ [1,ζ1], ξ2 ∈ [1,ζ2], ξ3 ∈ [1,ζ3], Δr_{ij_ξ1} ∈ Π_{Δr_ij},
01:  |   v_{i_ξ2} ∈ Π_{v_i}, v_{j_ξ3} ∈ Π_{v_j} do
02:  |   run consensus mechanism (6) with Δr_{ij_ξ1}, v_{i_ξ2} and v_{j_ξ3}
03:  |   find Λ_γ ⊆ Π_γ, Λ_k ⊆ Π_k satisfy safety constraint
04:  |   if Λ_γ = ∅ || Λ_k = ∅ then
05:  |   |   γ_{(ξ1,ξ2,ξ3)} = NaN, k_{(ξ1,ξ2,ξ3)} = NaN
06:  |   else
07:  |   |   find Ψ_γ ⊆ Λ_γ, Ψ_k ⊆ Λ_k satisfy efficiency constraint
08:  |   |   if |Ψ_γ| == |Ψ_k| == 1 then
09:  |   |   |   γ_{(ξ1,ξ2,ξ3)} ∈ Ψ_γ, k_{(ξ1,ξ2,ξ3)} ∈ Ψ_k
10:  |   |   else
11:  |   |   |   find Φ_γ ⊆ Ψ_γ, Φ_k ⊆ Ψ_k satisfy comfort constraint
12:  |   |   |   if |Φ_γ| == |Φ_k| == 1 then
13:  |   |   |   |   γ_{(ξ1,ξ2,ξ3)} ∈ Φ_γ, k_{(ξ1,ξ2,ξ3)} ∈ Φ_k
14:  |   |   |   else
15:  |   |   |   |   γ_{(ξ1,ξ2,ξ3)} = min_{γ∈Φ_γ} Φ_γ, k_{(ξ1,ξ2,ξ3)} = min_{k∈Φ_k} Φ_k
16:  |   |   |   end if
17:  |   |   end if
18:  |   end if
19:  end for
```

Figure 4

Flowchart: search the lookup table in real time 

```
Input:  (Δr_ij(t_0), v_i(t_0), v_j(t_0 − τ_ij(t_0))),  (ζ1 × ζ2 × ζ3) size
of lookup table
Output: values of control gains k and γ
01: for Δr_ij(t_0), v_i(t_0), v_j(t_0 − τ_ij(t_0)) do
02:     if Δr_ij(t_0) < Δr_ij_1 ‖ Δr_ij(t_0) > Δr_ij_ζ1 ‖ v_i(t_0) < v_i_1 ‖ v_i(t_0) >
03:        v_i_ζ2 ‖ v_j(t_0 − τ_ij(t_0)) < v_j_1 ‖ v_j(t_0 − τ_ij(t_0)) > v_j_ζ3  then
04:         return γ = NaN, k = NaN
05:     else
06:         find (Δr_ij_ξ1 | min |Δr_ij(t_0) − Δr_ij_ξ1|),
07:              (v_i_ξ2 | min |v_i(t_0) − v_i_ξ2|),
08:              (v_j_ξ3 | min |v_j(t_0 − τ_ij(t_0)) − v_j_ξ3|)
09:         return γ = γ(Δr_ij_ξ1, v_i_ξ2, v_j_ξ3), k = k(Δr_ij_ξ1, v_i_ξ2, v_j_ξ3)
10:     end if
11: end for
```

Figure 5

$\Delta r_{i,j}(t_0) = 60\ m$

| $v_i(t_0)$ \ $v_j(t_0-\tau_{i,j}(t_0))$ | 2 | 4 | 6 | 8 | 10 | 12 | 14 | 16 | 18 | 20 | 22 | 24 | 26 | 28 | 30 | 32 | 34 |
|---|---|---|---|---|---|---|---|---|---|---|---|---|---|---|---|---|---|
| 2 | 0.5 | 0.5 | 0.5 | 0.5 | 0.5 | 0.5 | 0.5 | 0.5 | 0.5 | 0.7 | 0.5 | 0.4 | 0.9 | 0 | 0 | 0 | 0 |
| 4 | 0.3 | 0.3 | 0.3 | 0.3 | 0.5 | 0.5 | 0.5 | 0.5 | 0.5 | 0.5 | 0.8 | 0.4 | 0.5 | 0.5 | 0.4 | 0 | 0 |
| 6 | 0.3 | 0.3 | 0.3 | 0.3 | 0.3 | 0.3 | 0.5 | 0.5 | 0.5 | 0.5 | 0.5 | 0.4 | 0.4 | 0.5 | 0.3 | 0.5 | 0.6 |
| 8 | 0.3 | 0.3 | 0.3 | 0.3 | 0.3 | 0.3 | 0.3 | 0.5 | 0.5 | 0.5 | 0.5 | 0.5 | 0.4 | 0.4 | 0.3 | 0.3 | 0.5 |
| 10 | 0.5 | 0.3 | 0.3 | 0.3 | 0.3 | 0.3 | 0.3 | 0.3 | 0.3 | 0.5 | 0.5 | 0.5 | 0.6 | 0.6 | 0.5 | 0.5 | 0.3 |
| 12 | 0.5 | 0.5 | 0.3 | 0.3 | 0.3 | 0.3 | 0.3 | 0.3 | 0.3 | 0.3 | 0.5 | 0.5 | 0.5 | 0.5 | 0.4 | 0.4 | 0.5 |
| 14 | 0.5 | 0.5 | 0.5 | 0.5 | 0.5 | 0.3 | 0.3 | 0.3 | 0.3 | 0.3 | 0.3 | 0.3 | 0.5 | 0.5 | 0.7 | 0.4 | 0.4 |
| 16 | 0.5 | 0.5 | 0.5 | 0.5 | 0.5 | 0.5 | 0.5 | 0.3 | 0.3 | 0.3 | 0.3 | 0.3 | 0.5 | 0.5 | 0.5 | 0.9 | 0.4 |
| 18 | 0.5 | 0.5 | 0.5 | 0.5 | 0.5 | 0.5 | 0.5 | 0.5 | 0.3 | 0.3 | 0.3 | 0.3 | 0.5 | 0.5 | 0.7 | 0.5 | 0.6 |
| 20 | 0.5 | 0.5 | 0.5 | 0.5 | 0.5 | 0.5 | 0.5 | 0.5 | 0.5 | 0.3 | 0.3 | 0.3 | 0.3 | 0.5 | 0.5 | 0.5 | 0.5 |
| 22 | 0.5 | 0.5 | 0.5 | 0.5 | 0.5 | 0.5 | 0.5 | 0.5 | 0.5 | 0.3 | 0.3 | 0.3 | 0.3 | 0.5 | 0.5 | 0.5 | 0.5 |
| 24 | 0.5 | 0.5 | 0.5 | 0.5 | 0.5 | 0.5 | 0.5 | 0.5 | 0.3 | 0.3 | 0.3 | 0.3 | 0.3 | 0.5 | 0.5 | 0.5 | 0.5 |
| 26 | 0.5 | 0.5 | 0.5 | 0.5 | 0.5 | 0.5 | 0.5 | 0.5 | 0.3 | 0.3 | 0.3 | 0.5 | 0.5 | 0.5 | 0.5 | 0.5 | 0.5 |
| 28 | 0.5 | 0.5 | 0.5 | 0.5 | 0.5 | 0.5 | 0.5 | 0.5 | 0.3 | 0.3 | 0.3 | 0.3 | 0.3 | 0.5 | 0.5 | 0.5 | 0.5 |
| 30 | 0 | 0.9 | 0.8 | 0.7 | 0.6 | 0.4 | 0.5 | 0.5 | 0.5 | 0.3 | 0.3 | 0.3 | 0.3 | 0.5 | 0.5 | 0.5 | 0.5 |
| 32 | 0 | 0 | 0 | 0 | 0 | 0.8 | 0.7 | 0.6 | 0.4 | 0.3 | 0.3 | 0.3 | 0.3 | 0.5 | 0.5 | 0.5 | 0.5 |
| 34 | 0 | 0 | 0 | 0 | 0 | 0 | 0.7 | 0.6 | 0.4 | 0.5 | 0.5 | 0.3 | 0.3 | 0.5 | 0.5 | 0.5 | 0.5 |

Figure 6

Table 1: Settings of Simulation Scenarios

| | $\Delta r_{ij}(t_0)$ (m) | $v_i(t_0)$ (m/s) | $v_j(t_0 - \tau_{ij}(t_0))$ (m/s) |
|---|---|---|---|
| Scenario 1 | 50 | 28 | 14 |
| Scenario 2 | 20 | 16 | 22 |
| Scenario 3 | -30 | 18 | 10 |
| Scenario 4 | -80 | 4 | 21 |

Figure 7A

Table 2: Simulation Results

| Scenario | Convergence time (s) | | | | Maximum jerk ($m/s^3$) | | | |
|---|---|---|---|---|---|---|---|---|
| | 1 | 2 | 3 | 4 | 1 | 2 | 3 | 4 |
| Consensus Mechanism (CM) | 24.9 | 22.9 | 32.1 | 28.3 | 2.3 | 0.8 | 1.6 | 1.6 |
| Existing Solution 1 (ES 1) | 29.3 | 32.1 | 41.8 | 40.1 | 1.5 | 1.6 | 2.3 | 0.7 |
| Existing Solution 2 (ES 2) | 35.9 | 35.0 | 56.5 | 57.6 | 21.2 | 20.7 | 25.7 | 13.4 |

Figure 7B

LONGITUDINAL MOTION CONTROL OF CONNECTED AND AUTOMATED VEHICLES

BACKGROUND

The specification relates to providing longitudinal motion control of connected and automated vehicles. In some embodiments, the specification relates to a lookup table to improve performance of a consensus mechanism applied in Connected and Automated Vehicle (CAV) technologies and provide longitudinal motion control of connected and automated vehicles.

As vehicles become more automated and interconnected, it is desirable for the vehicles to have a way to coordinate their actions and data processing operations among one another. Existing solutions have been trying to develop a "consensus algorithm" for helping vehicles to coordinate their activities. However, no suitable consensus algorithm has been developed.

SUMMARY

One general aspect of embodiments described herein includes a computer program product including a non-transitory memory of an onboard vehicle computer system of a connected vehicle storing computer-executable code that, when executed by a processor, causes the processor to: build a lookup table that is populated with control gain values for a consensus mechanism, where the consensus mechanism is configured to control behavior of a flow of vehicles in a Cooperative Adaptive Cruise Control (CACC) application, where the control gain values are created based on a satisfaction of one or more driving constraints by the consensus mechanism; receive data describing an initial vehicle state related to the flow of vehicles; search the lookup table for a set of control gain values that match the initial vehicle state; and implement the consensus mechanism to execute a longitudinal motion control on the flow of vehicles based on the set of control gain values so that the behavior of the flow of vehicles in the CACC application is coordinated. Other embodiments of this aspect include corresponding computer systems, apparatus, and computer programs recorded on one or more computer storage devices, each configured to perform the actions of the methods.

Implementations may include one or more of the following features. The computer program product where the satisfaction of the one or more driving constraints includes a satisfaction of a safety constraint where a distance headway requirement between a leading vehicle and a following vehicle in the flow of vehicles is met. The computer program product where the satisfaction of the one or more driving constraints further includes a satisfaction of an efficiency constraint where a requirement on a convergence time of the consensus mechanism is met. The computer program product where the satisfaction of the one or more driving constraints further includes a satisfaction of a comfort constraint where a requirement on a maximum changing rate of the consensus mechanism is met. Implementations of the described techniques may include hardware, a method or process, or computer software on a computer-accessible medium.

One general aspect includes a method for a connected vehicle, including: building a lookup table that is populated with control gain values for a consensus mechanism, where the control gain values are created based on a satisfaction of one or more driving constraints by the consensus mechanism; receiving data describing an initial vehicle state related to a flow of vehicles; searching the lookup table for a set of control gain values based on the initial vehicle state; and implementing the consensus mechanism on the flow of vehicles based on the set of control gain values so that behavior of the flow of vehicles is coordinated. Other embodiments of this aspect include corresponding computer systems, apparatus, and computer programs recorded on one or more computer storage devices, each configured to perform the actions of the methods.

Implementations may include one or more of the following features. The method where an improved performance of the consensus mechanism is achieved based on the set of control gain values that match the initial vehicle state. The method where the improved performance of the consensus mechanism includes one or more of: a decreased convergence time of the consensus mechanism; and a decreased maximum jerk of the consensus mechanism. The method where the satisfaction of the one or more driving constraints includes a satisfaction of a safety constraint where a distance headway requirement between a leading vehicle and a following vehicle in the flow of vehicles is met. The method where the satisfaction of the one or more driving constraints further includes a satisfaction of an efficiency constraint where a requirement on a convergence time of the consensus mechanism is met. The method where the satisfaction of the one or more driving constraints further includes a satisfaction of a comfort constraint where a requirement on a maximum changing rate of the consensus mechanism is met. The method where the maximum changing rate relates to one or more of: a maximum acceleration; a maximum deceleration; and a maximum jerk. The method where the initial vehicle state includes one or more of: an initial distance headway between the leading vehicle and the following vehicle; an initial speed of the leading vehicle; and an initial speed of the following vehicle. Implementations of the described techniques may include hardware, a method or process, or computer software on a computer-accessible medium.

One general aspect includes a system including an onboard vehicle computer system of a connected vehicle including a non-transitory memory storing computer code which, when executed by the onboard vehicle computer system, causes the onboard vehicle computer system to: build a lookup table that is populated with control gain values for a consensus mechanism, where the control gain values are created based on a satisfaction of one or more driving constraints by the consensus mechanism; receive data describing an initial vehicle state related to a flow of vehicles; search the lookup table for a set of control gain values based on the initial vehicle state; and implement the consensus mechanism on the flow of vehicles based on the set of control gain values so that behavior of the flow of vehicles is coordinated. Other embodiments of this aspect include corresponding computer systems, apparatus, and computer programs recorded on one or more computer storage devices, each configured to perform the actions of the methods.

Implementations may include one or more of the following features. The system where an improved performance of the consensus mechanism is achieved based on the set of control gain values that match the initial vehicle state. The system where the improved performance of the consensus mechanism includes one or more of: a decreased convergence time of the consensus mechanism; and a decreased maximum jerk of the consensus mechanism. The system where the satisfaction of the one or more driving constraints includes a satisfaction of a safety constraint where a distance headway requirement between a leading vehicle and a following vehicle in the flow of vehicles is met. The system where the satisfaction of the one or more driving constraints further includes a satisfaction of an efficiency constraint where a requirement on a convergence time of the consensus mechanism is met. The system where the satisfaction of the one or more driving constraints further includes a satisfaction of a comfort constraint where a requirement on a maximum changing rate of the consensus mechanism is met. The system where the maximum changing rate relates to one or more of: a maximum acceleration; a maximum deceleration; and a maximum jerk. The system where the initial vehicle state includes one or more of: an initial distance headway between the leading vehicle and the following vehicle; an initial speed of the leading vehicle; and an initial speed of the following vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 4 depicts a flowchart for building a lookup table offline according to some embodiments.

FIG. 5 depicts a flowchart for searching a lookup table in real time or near real time according to some embodiments.

FIG. 6 is a graphical representation illustrating a part of an example lookup table according to some embodiments.

FIGS. 7A-7C are graphical representations illustrating simulations of a lookup table-based consensus mechanism according to some embodiments.

DETAILED DESCRIPTION

Figure 1A:
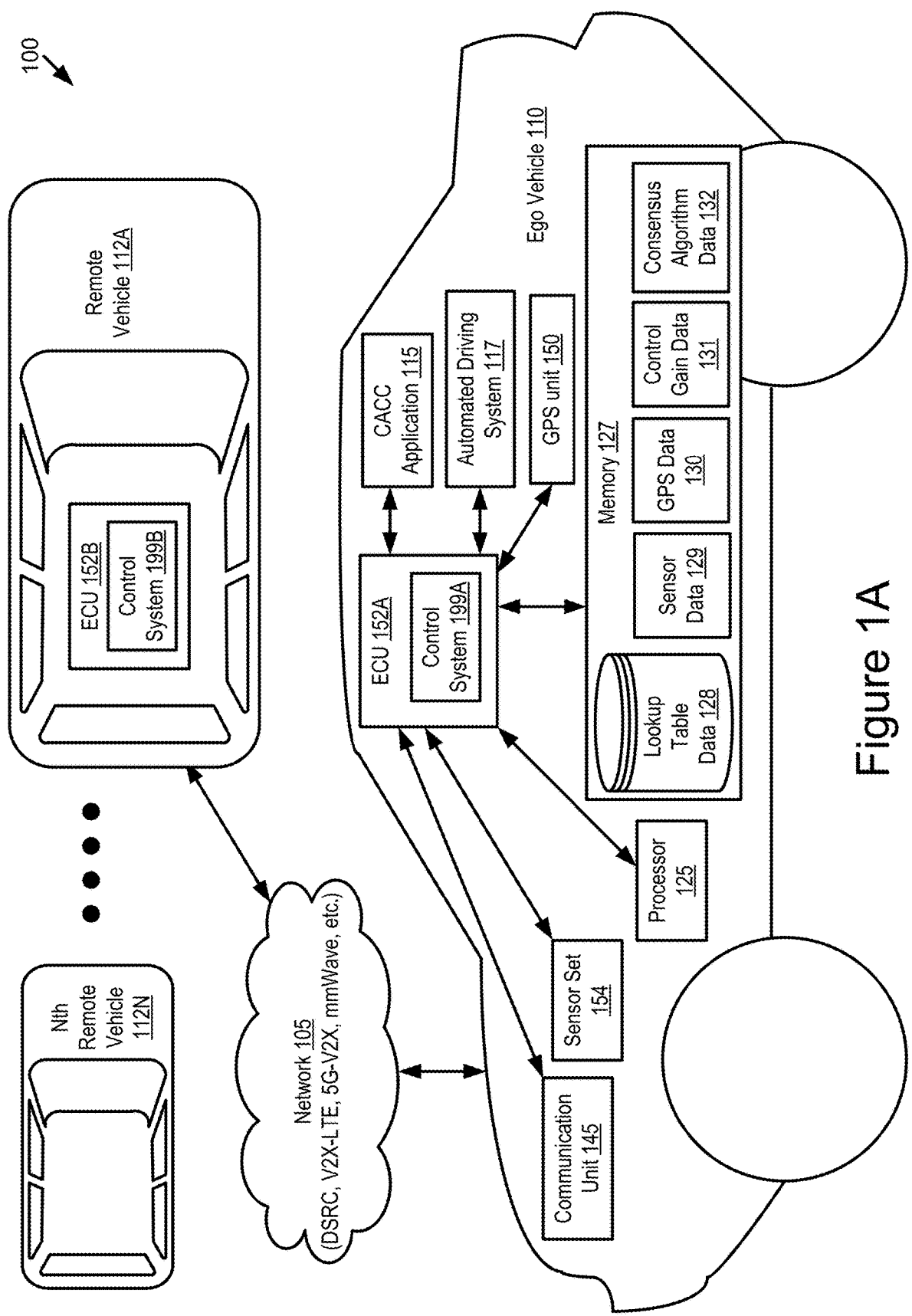
FIG. 1A is a block diagram illustrating an operating environment for a control system according to some embodiments.

A CACC application is an example use case of CAV technologies where a consensus algorithm or a consensus mechanism can be designed and implemented. The CACC application may include a string of vehicles which take advantage of Vehicle-to-Vehicle (V2V) communications to follow each other with a harmonized speed and distance headway.

Stability and robustness of consensus algorithms in the use of the CACC application (e.g., for longitudinal motion control) may have been discussed and analyzed. However, existing solutions for the consensus algorithms are not adequate because none of them focuses on validating the system performance in terms of real-world constraints. The existing solutions for the CACC application are not adequate for use in real-world vehicles at least for the following example reasons.

For example, the existing solutions do not consider solving an issue of how to tune control gains of a consensus algorithm to satisfy a safety constraint that is relevant to real-world applications (versus merely theoretical applications). In another example, the existing solutions do not consider solving an issue of how to tune the control gains of the consensus algorithm to satisfy an efficiency constraint. In yet another example, the existing solutions do not consider solving an issue of how to tune the control gains of the consensus algorithm to satisfy a comfort constraint that can be meaningful to real-world consumers. In still yet another example, the existing solutions fail to respond to changes in different driving scenarios. Different initial states of vehicles (e.g., a longitudinal position, speed, etc.) may have a non-negligible impact on the performance of the consensus algorithm. The existing solutions fail to adjust values of the control gains to allow the consensus algorithm to cope with different driving scenarios.

Described herein are embodiments of a control system that is installed in a connected vehicle. The control system is operable to provide a lookup table for a consensus mechanism used in CAV technologies (e.g., a CACC application) to improve performance of the consensus mechanism. The control system incorporates the lookup table into the consensus mechanism, which allows the consensus mechanism to consider factors such as a safety constraint, an efficiency constraint and a comfort constraint when providing its functionality. The consensus mechanism described herein may be referred to as a lookup table-based consensus mechanism.

Besides the CACC application, the lookup table-based consensus mechanism may also be applied in other use cases such as a cooperative on-ramp merging in CAV technologies. In the cooperative on-ramp merging, a vehicle on a first lane can be projected on a second lane as a "ghost" leader, so that a following vehicle on the second lane can follow the "ghost" leader through Vehicle-to-Vehicle (V2V) communications.

In some embodiments, the control system may be installed in an onboard unit of a connected vehicle. Multiple connected vehicles may include their own instances of the control system. The connected vehicles may be autonomous or semi-autonomous. For example, the connected vehicles may be a flow of connected and automated vehicles. The connected vehicles may coordinate with one another on various variables (e.g., control gain variables) to optimize their operation and prevent accidents. The control systems of these connected vehicles build a lookup table, where the lookup table is operable to help the connected vehicles build consensus about values for the variables. The control systems then broadcast Vehicle-to-Everything (V2X) messages announcing the consensus determination so that the behavior of the connected vehicles is coordinated.

Example improvements and advantages provided by the control system described herein are described here. For example, different from the existing solutions, the control system described herein provides an approach to tune the control gains of the consensus mechanism to satisfy one or more of the safety constraint, the efficiency constraint and the comfort constraint. In another example, different initial states of vehicles may have a non-negligible impact on the performance of the consensus mechanism. The control system is operable to adjust values of the control gains based on the different initial states of the vehicles to allow the consensus mechanism to cope with different driving scenarios. Other example improvements and advantages are also possible.

As described herein, examples of V2X communications include Dedicated Short Range Communication (DSRC) (including Basic Safety Messages (BSMs) and Personal Safety Messages (PSMs), among other types of DSRC communication). Further examples of V2X communications include: Long-Term Evolution (LTE); millimeter wave (mmWave) communication; 3G; 4G; 5G; LTE-V2X; 5G-V2X; LTE-V2V; LTE-Device-to-Device (LTE-D2D); or Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X message) described herein include, but are not limited to, the following messages: a DSRC message; a BSM message; and a LTE message. Further examples of a wireless message include one or more of the following: a LTE-V2X message (e.g., a LTE-V2V message, a LTE-V2I message, a LTE-V2N message, etc.); a 5G-V2X message; and a millimeter wave message, etc.

Example Overview

Referring to FIG. 1A, depicted is an operating environment 100 for a control system 199 according to some embodiments. The operating environment 100 may include one or more of the following elements: an ego vehicle 110; and one or more remote vehicles 112 (e.g., a remote vehicle 112A, ..., a remote vehicle 112N). These elements of the operating environment 100 may be communicatively coupled to a network 105. In practice, the operating environment 100 may include any number of ego vehicles 110, remote vehicles 112 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS) and multimedia messaging service (MMS). In some embodiments, the network 105 further includes networks for hypertext transfer protocol (HTTP), direct data connection, wireless application protocol (WAP), e-mail, DSRC, full-duplex wireless communication and mmWave. In some embodiments, the network 105 further includes networks for WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE, 5G-V2X or any other mobile data network or combination of mobile data networks. Further, the network 105 may include one or more IEEE 802.11 wireless networks.

The ego vehicle 110 may be any type of vehicle. For example, the ego vehicle 110 may include one of the following types of vehicles: a car; a truck; a sports utility vehicle; a bus; a semi-truck; a drone; or any other roadway-based conveyance. The ego vehicle 110 may be a connected vehicle that includes a communication unit and is capable of communicating with other endpoints connected to the network 105.

In some embodiments, the ego vehicle 110 is a DSRC-enabled vehicle which includes a DSRC radio and a DSRC-compliant Global Positioning System (GPS) unit. The ego vehicle 110 may also include other V2X radios besides a DSRC radio. DSRC is not a requirement of embodiments described herein, and any form of V2X communications is also feasible.

The ego vehicle 110 may include one or more of the following elements: a processor 125; a memory 127; a communication unit 145; a GPS unit 150; an electronic control unit (ECU) 152A; a sensor set 154; and a control system 199A. The ego vehicle 110 may further include an automated driving system 117 and a CACC application 115. These elements of the ego vehicle 110 may be communicatively coupled to one another via a bus.

In some embodiments, the processor 125 and the memory 127 may be elements of an onboard vehicle computer system (such as computer system 200 described below with reference to FIG. 2). The onboard vehicle computer system may be operable to cause or control the operation of the control system 199A. The onboard vehicle computer system may be operable to access and execute the data stored on the memory 127 to provide the functionality described herein for the control system 199A or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures. Example computing architectures include a complex instruction set computer (CISC) architecture, a reduced instruction set computer (RISC) architecture, or an architecture implementing a combination of instruction sets. The ego vehicle 110 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media. Example permanent storage devices include a hard disk drive, a floppy disk drive, a CD-ROM device, a DVD-ROM device, a DVD-RAM device, a DVD-RW device, and a flash memory device, etc. Additional example permanent storage devices may include some other mass storage device for storing information on a more permanent basis. The ego vehicle 110 may include one or more memories 127.

The memory 127 may store one or more of the following elements: lookup table data 128; sensor data 129; GPS data 130; control gain data 131; and consensus algorithm data 132.

The lookup table data 128 may include digital data that describes a lookup table. The lookup table is described below in more detail.

The sensor data 129 may include digital data that describes one or more sensor measurements generated by the sensor set 154 of the ego vehicle 110. For example, the sensor data 129 may include digital data that describes a speed and an acceleration or deceleration of the ego vehicle 110. In another example, the sensor data 129 may include digital data that describes a relative position between the ego vehicle 110 and the remote vehicle 112 measured by one or more range finding and position locating sensors such as LIDAR, radar, etc. Other example sensor data are also possible.

The GPS data 130 may include digital data that describes a geographic location of the ego vehicle 110. The GPS data 130 may be generated by the GPS unit 150.

The control gain data 131 may include digital data that describes an output of the lookup table based on an initial vehicle state. The output of the lookup table may include a set of control gain values for a set of control gain variables based on the initial vehicle state. The initial vehicle state is described below in more detail.

The consensus algorithm data 132 may include digital data that describes a consensus mechanism. The consensus mechanism is modified so that it is operable to receive an output from the lookup table as an input that initializes the control gain variables of the consensus mechanism. In this way, the consensus mechanism controls the operation of the CACC application 115 based on this output from the lookup table. The consensus mechanism is described below in more detail.

The communication unit 145 transmits and receives data to and from the network 105 or to another communication channel. In some embodiments, the communication unit 145 may include a DSRC transceiver, a DSRC receiver and other hardware or software necessary to make the ego vehicle 110 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods. Example wireless communication methods may include one or more of the following: IEEE 802.11; and IEEE 802.16, BLUETOOTH®. Example wireless communication methods may further include EN ISO 14906:2004 Electronic Fee Collection—Application interface EN 11253:2004 DSRC—Physical layer using microwave at 5.8 GHz (review). Example wireless communication methods may further include EN 12795: 2002 DSRC—DSRC Data link layer: Medium Access and Logical Link Control (review). Example wireless communication methods may further include EN 12834:2002 DSRC—Application layer (review) and EN 13372:2004 DSRC—DSRC profiles for RTTT applications (review). Example wireless communication methods may further include the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a cellular communications transceiver for sending and receiving data over a cellular communications network. For example, the data may be sent or received via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 may include a V2X radio. The V2X radio may include a hardware element including a DSRC transmitter which is operable to transmit DSRC messages on the 5.9 GHz band. The 5.9 GHz band is reserved for DSRC messages. The hardware element may also include a DSRC receiver which is operable to receive DSRC messages on the 5.9 GHz band.

In some embodiments, the GPS unit 150 is a conventional GPS unit of the ego vehicle 110. For example, the GPS unit 150 may include hardware that wirelessly communicates with a GPS satellite to retrieve data that describes a geographic location of the ego vehicle 110. In some embodiments, the GPS unit 150 is a DSRC-compliant GPS unit of the ego vehicle 110. The DSRC-compliant GPS unit is operable to provide GPS data describing the geographic location of the ego vehicle 110 with lane-level accuracy.

The lane-level accuracy indicates that the geographic location of the ego vehicle 110 has an accuracy of plus or minus 1.5 meters of its actual location in the real-world. A lane of a roadway is about 3 meters wide. Thus, an accuracy of plus or minus 1.5 meters is sufficiently precise that it enables other endpoints which receive the location data (via DSRC messages) to know the exact lane of travel of each vehicle on the roadway. The location data can be GPS data that describes the geographic location and the time when the ego vehicle 110 is at this geographic location.

The ECU 152A can include one or more processors and one or more memories. In some embodiments, the control system 199A of the ego vehicle 110 is installed on the ECU 152A.

The sensor set 154 includes one or more sensors that are operable to measure a roadway environment outside of the ego vehicle 110. For example, the sensor set 154 may include one or more sensors that record one or more physical characteristics of the roadway environment that is proximate to the ego vehicle 110. The memory 127 may store sensor data that describes the one or more physical characteristics recorded by the sensor set 154.

In some embodiments, the sensor set 154 may include one or more of the following vehicle sensors: a camera; a LIDAR sensor; a radar sensor; a laser altimeter; an infrared detector; a motion detector; a thermostat; and a sound detector. The sensor set 154 may also include one or more of the following sensors: a carbon monoxide sensor; a carbon dioxide sensor; an oxygen sensor; a mass air flow sensor; and an engine coolant temperature sensor. The sensor set 154 may also include one or more of the following sensors: a throttle position sensor; a crank shaft position sensor; an automobile engine sensor; a valve timer; an air-fuel ratio meter; and a blind spot meter. The sensor set 154 may also include one or more of the following sensors: a curb feeler; a defect detector; a Hall effect sensor, a manifold absolute pressure sensor; a parking sensor; a radar gun; a speedometer; and a speed sensor. The sensor set 154 may also include one or more of the following sensors: a tire-pressure monitoring sensor; a torque sensor; and a transmission fluid temperature sensor. The sensor set 154 may also include one or more of the following sensors: a turbine speed sensor (TSS); a variable reluctance sensor; a vehicle speed sensor (VSS); a water sensor; a wheel speed sensor; and any other type of automotive sensor.

The CACC application 115 may be operable to utilize the consensus mechanism to achieve cooperative adaptive cruise control of the ego vehicle 110. Upon execution of the consensus mechanism on the CACC application 115, behavior of a string of vehicles (or a flow of vehicles) may be coordinated to achieve a harmonized speed and distance headway.

The automated driving system 117 may provide some or all of the autonomous functionality for the ego vehicle 110. In some embodiments, the automated driving system 117 may provide the autonomous functionality with aid of the CACC application 115.

The remote vehicle 112 may have a structure similar to that of the ego vehicle 110. Similar description is not repeated here. The operating environment 100 may include multiple remote vehicles 112 (e.g., the remote vehicle 112A, . . . , the remote vehicle 112N). In some embodiments, the remote vehicle 112A may include an ECU 152B and an instance of the control system (e.g., a control system 199B) installed in the ECU 152B. The remote vehicle 112A may also include a communication unit (not shown in FIG. 1A). The remote vehicle 112N may have a structure similar to that of the remote vehicle 112A, and so, similar description is not repeated here.

The ECUs 152A and 152B may have a similar structure and provide similar functionality, and may be referred to herein as "ECU 152" individually or collectively.

The control systems 199A and 199B may have a similar structure and provide similar functionality, and may be referred to herein as "control system 199" individually or collectively.

In some embodiments, the control system 199 includes software that is operable, when executed by the processor 125, to cause the processor 125 to execute one or more steps of a method 300 and flowcharts 400 and 500 described below with reference to FIGS. 3-5. In some embodiments, the control system 199 may be implemented using hardware including a field-programmable gate array ("FPGA") or an application-specific integrated circuit ("ASIC"). In some other embodiments, the control system 199 may be implemented using a combination of hardware and software. The control system 199 may be stored in a combination of the devices (e.g., servers or other devices), or in one of the devices.

The control system 199 is described below in more detail with reference to FIGS. 2-7C.

Consensus Mechanism

Figure 1B:
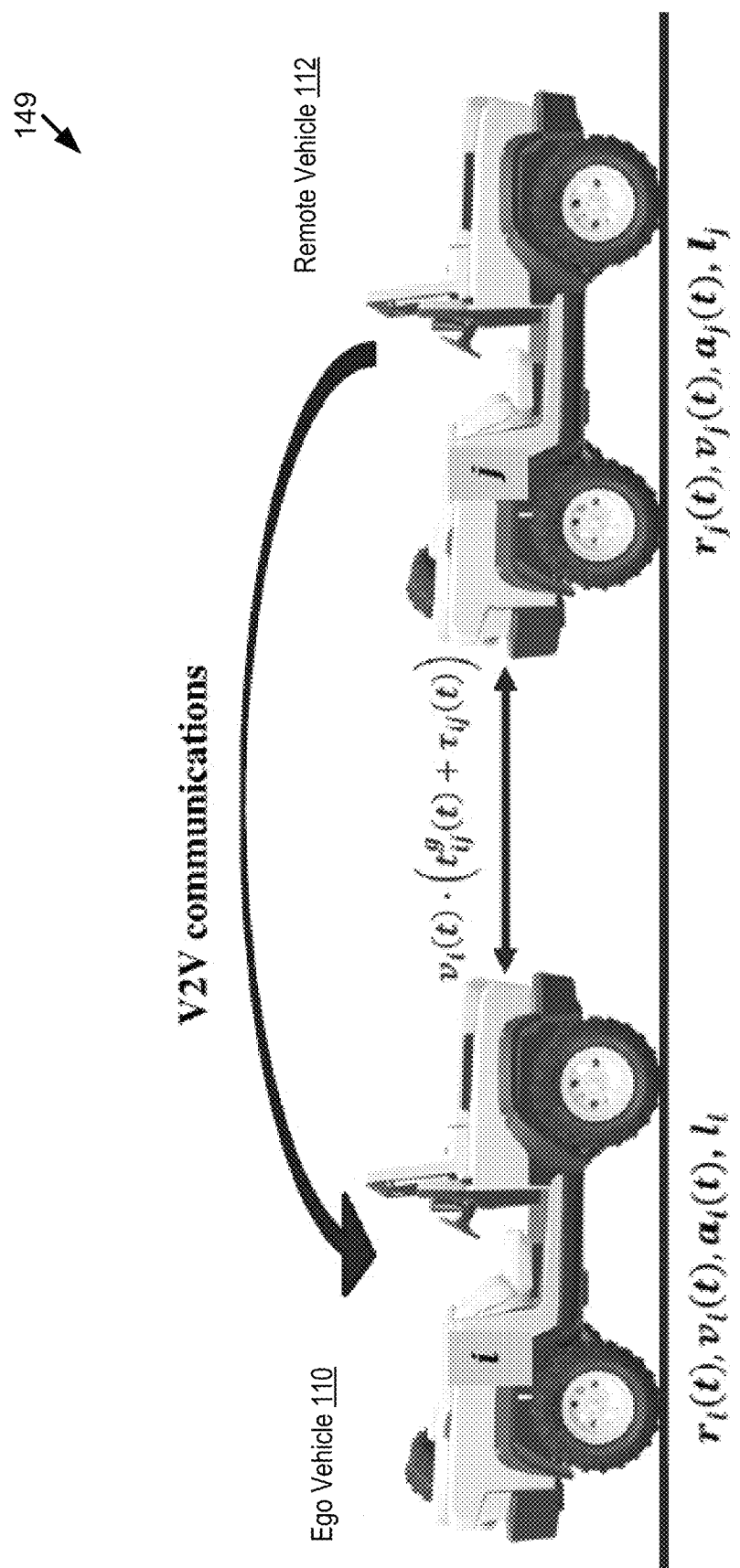
FIG. 1B is a graphical representation illustrating an example predecessor following information flow topology for a flow of vehicles according to some embodiments.

Referring to FIG. 1B, depicted is a graphical representation 149 illustrating an example predecessor following information flow topology for a flow of vehicles according to some embodiments. The ego vehicle 110 (e.g., a following vehicle i) and the remote vehicle 112 (e.g., a leading vehicle j) are illustrated in FIG. 1B. Parameters $r_i(t)$, $v_i(t)$, $a_i(t)$ and $l_i$ denote a longitudinal position, a longitudinal speed, a longitudinal acceleration and a length of the following vehicle i at time t, respectively. Parameters $r_j(t)$, $v_j(t)$, $a_j(t)$ and $l_j$ denote a longitudinal position, a longitudinal speed, a longitudinal acceleration and a length of the leading vehicle j at time t, respectively.

Second-order dynamics of the vehicle i can be expressed as:

$$\dot{r}_i = v_i(t), \qquad (1)$$

$$\dot{v}_i(t) = a_i(t). \qquad (2)$$

Without loss of generality, the consensus mechanism provided herein is described with reference to the predecessor following information flow topology shown in FIG. 1B. For example, in the predecessor following information flow topology, the following vehicle i only gets information from its immediate leading vehicle j through V2V communications.

The information flow topology of a string of vehicles can be represented by a directed graph $\mathcal{G} = (\mathcal{H}, \mathcal{E})$, where $\mathcal{H} = \{1, 2, \ldots, n\}$ is a finite nonempty node set and $\mathcal{E} \subseteq \mathcal{H} \times \mathcal{H}$ is an edge set of ordered pairs of nodes (i.e., edges). The edge $(i,j) \in \mathcal{E}$ denotes that vehicle j can obtain information from vehicle i. The neighbors of the vehicle i are denoted by $\mathcal{N} = \{j \in \mathcal{H} : (i,j) \in \mathcal{E}\}$. The topology of the graph is associated with an adjacency matrix $\mathcal{A} = [a_{ij}] \in \mathbb{R}$, which is defined such that $a_{ij} = 1$ if edge $(j,i) \in \mathcal{E}$, $a_{ij} = 0$ if edge $(j,i) \notin \mathcal{E}$, and $a_{ii} = 0$, $\mathcal{L} = [\ell_{ij}] \in \mathbb{R}$ (i.e., $\ell_{ij} = -a_{ij}$, $i \neq j$, $\ell_{ij} = \Sigma_{j=1, j\neq i}^n a_{ij}$) is the nonsymmetrical Laplacian matrix associated with $\mathcal{G}$. A directed spanning tree is a directed tree formed by graph edges that connects all the nodes of the graph.

Based on the above equations (1) and (2), a double-integrator distributed consensus mechanism can be given by:

$$\dot{r}_i(t) = v_i(t) \qquad (3)$$

$$\dot{v}_i(t) = -\Sigma_{j=1}^n a_{ij} k_{ij} \cdot [(r_i(t) - r_j(t)) + \gamma \cdot (v_i(t) - v_j(t))], i \in \mathcal{E} \qquad (4)$$

where $k_{ij} > 0$ is a control gain variable, and $\gamma > 0$ is another control gain variable that denotes a coupling strength between the state derivatives. Consensus of this consensus mechanism is reached when $r_i(t) \to r_j(t)$ and $v_i(t) \to v_j(t)$. Here, "→" means a value on the left-hand side converges to a value on the right-hand side.

In equation (4), a desired position between two vehicles is zero, i.e., $r_i(t) - r_j(t) \to 0$. This might be feasible in a robotics rendezvous problem when multiple robots try to meet at the same location. However, in a car-following problem like Error! Reference source not found.B, the desired position difference is a distance headway between two vehicles, and it cannot be zero due to a safety constraint (otherwise rear-end collision occurs). Therefore, an extra term is added in the position consensus part $(r_j(t) - r_j(t))$ to set the desired distance headway between two vehicles. In addition, a time delay is not considered in equation (4), while a communication delay is not negligible in the car-following case of CAVs.

Based on the aforementioned issues, a second-order integrator consensus mechanism for a longitudinal motion control of CAVs in a car-following case can be expressed as:

$$\dot{r}_i = v_i(t) \qquad (5)$$

$$\dot{v}_i(t) = -a_{ij} k_{ij} \cdot [(r_i(t) - r_j(t - \tau_{ij}(t)) + l_j + v_i(t) \cdot (t_{ij}^g(t) + \tau_{ij}(t))) + \gamma_i \cdot (v_i(t) - v_j(t - \tau_{ij}(t)))], i, j \in \mathcal{E} \qquad (6)$$

where $\tau_{ij}(t)$ denotes a time-variant communication delay between two vehicles i and j, $t_{ij}^g(t)$ is a time-variant desired time gap between the two vehicles i and j, which can be adjusted by factors such as a road grade, vehicle mass, braking ability, etc. The term $[l_j + v_i(t) \cdot (t_{ij}^g(t) + \tau_{ij}(t))]$ is a form of the distance headway between the two vehicles i and j.

As can be seen in the consensus mechanism expressed in equation (6), there are two types of control gain variables $k_{ij}$ and $\gamma_i$. For different initial vehicle states of connected and automated vehicles, a consensus mechanism tends to behave differently in terms of a headway overshoot, a convergence rate and a maximum changing rate. A set of control gain values applicable to one initial vehicle state does not necessarily mean that they are applicable to all other initial vehicle states. Thus, the control system 199 described herein is operable to build a lookup table that can be used to provide optimal values of control gain variables to the consensus mechanism in real time when the initial vehicle states are dynamically changing.

Example Computer System

Figure 2:
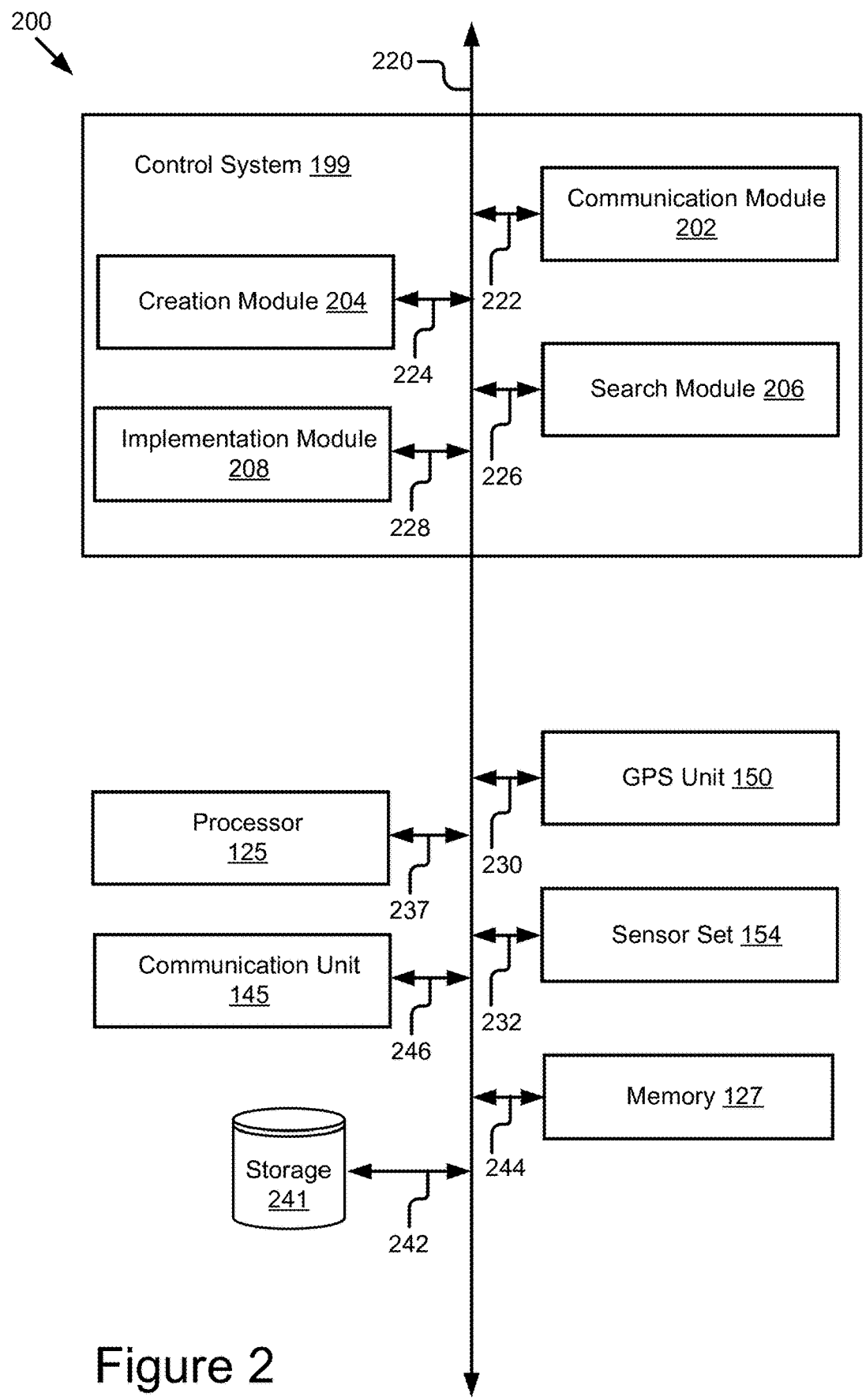
FIG. 2 is a block diagram illustrating an example computer system including the control system according to some embodiments.

Referring now to FIG. 2, depicted is a block diagram illustrating an example computer system 200 including the control system 199 according to some embodiments. In some embodiments, the computer system 200 may include a special-purpose computer system that is programmed to perform one or more steps of the method 300 and flowcharts 400 and 500 described below with reference to FIGS. 3-5.

In some embodiments, the computer system 200 may be an element of the ego vehicle 110. In some embodiments, the computer system 200 may be an onboard vehicle computer of the ego vehicle 110. In some embodiments, the computer system 200 may include an engine control unit, head unit or some other processor-based computing device of the ego vehicle 110.

The computer system 200 may include one or more of the following elements according to some examples: the control system 199; the processor 125; and the communication unit 145. The computer system 200 may further include one or more of the following elements: the sensor set 154; the GPS unit 150; the memory 127; and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The sensor set 154 is communicatively coupled to the bus 220 via a signal line 232. The GPS unit 150 is communicatively coupled to the bus 220 via a signal line 230. The storage 241 is communicatively coupled to the bus 220 via a signal line 242. The memory 127 is communicatively coupled to the bus 220 via a signal line 244.

The following elements are described above with reference to FIG. 1A: the processor 125; the communication unit 145; the sensor set 154; the GPS unit 150; and the memory 127. Those descriptions will not be repeated here.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media (e.g., a hard disk drive, a floppy disk drive, a flash memory device, etc.) for storing information on a more permanent basis.

In the illustrated embodiment shown in FIG. 2, the control system 199 includes: a communication module 202; a creation module 204; a search module 206; and an implementation module 208. These components of the control system 199 are communicatively coupled to each other via the bus 220. In some embodiments, components of the control system 199 can be stored in a single server or device. In some other embodiments, components of the control system 199 can be distributed and stored across multiple servers or devices.

The communication module 202 can be software including routines for handling communications between the control system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, a V2X message including speed data of the remote vehicle 112 or speed data of the ego vehicle 110. The communication module 202 may send or receive any of the data or messages described above with reference to FIG. 1A via the communication unit 145.

In some embodiments, the communication module 202 receives data from the other components of the control system 199 and stores the data in one or more of the storage 241 and the memory 127. The other components of the control system 199 may cause the communication module 202 to communicate with the other elements of the computer system 200 or the operating environment 100 (via the communication unit 145). For example, the search module 206 may use the communication module 202 to communicate with the sensor set 154 and cause the sensor set 154 to record sensor data.

The creation module 204 can be software including routines for building a lookup table. In some embodiments, the creation module 204 can be stored in the memory 127 of the computer system 200 and can be accessible and executable by the processor 125. The creation module 204 may be adapted for cooperation and communication with the processor 125 and other components of the computer system 200 via a signal line 224.

In some embodiments, the creation module 204 is operable to build a lookup table that is populated with control gain values for a set of control gain variables of the consensus mechanism. The lookup table can be built offline. The consensus mechanism is configured to control behavior of a flow of vehicles in a CACC application or other example applications such as a cooperative on-ramp merging. The control gain values stored in the lookup table are values for the set of control gain variables of the consensus mechanism under different initial vehicle states related to the flow of vehicles. The set of control gain variables can include, for example, the control gain variables $k_{ij}$ and $\gamma_i$ shown in equation (6) described above.

The initial vehicle state includes, for example, an initial distance headway between a leading vehicle j (e.g., the remote vehicle 112) and a following vehicle i (e.g., the ego vehicle 110) in the flow of vehicles. The initial vehicle state further includes: an initial speed of the leading vehicle j; and an initial speed of the following vehicle i. The initial vehicle state may also include other initial data related to the flow of vehicles.

In some embodiments, the creation module 204 creates the control gain values in the lookup table based on a satisfaction of one or more driving constraints by the consensus mechanism. The creation module 204 populates the lookup table with the created control gain values and stores the lookup table in the memory 127 or the storage 241.

The one or more driving constraints include one or more of a safety constraint, an efficiency constraint, a comfort constraint and any other constraint. For example, the satisfaction of the one or more driving constraints includes a satisfaction of the safety constraint where a distance headway requirement between a leading vehicle and a following vehicle in the flow of vehicles is met. In another example, the satisfaction of the one or more driving constraints further includes a satisfaction of the efficiency constraint where a requirement on a convergence time of the consensus mechanism is met. In yet another example, the satisfaction of the one or more driving constraints further includes a satisfaction of the comfort constraint where a requirement on a maximum changing rate of the consensus mechanism is met. In some embodiments, the maximum changing rate relates to one or more of: a maximum acceleration; a maximum deceleration; and a maximum jerk.

The creation of the lookup table and the satisfaction of the one or more driving constraints are described below in more detail with reference to FIG. 4.

The search module 206 can be software including routines for searching a lookup table for a set of control gain values for a set of control gain variables of the consensus mechanism based on an initial vehicle state. In some embodiments, the search module 206 can be stored in the memory 127 of the computer system 200 and can be accessible and executable by the processor 125. The search module 206 may be adapted for cooperation and communication with the processor 125 and other components of the computer system 200 via a signal line 226.

In some embodiments, the search module 206 is operable to cause sensors of the sensor set 154 to record sensor data that describes one or more sensor measurements of the ego vehicle 110. In some embodiments, the search module 206 is operable to receive a V2X message from the remote vehicle 112, where the V2X message may include sensor data of the remote vehicle 112.

The search module 206 determines data describing an initial vehicle state related to the flow of vehicles based on one or more of the sensor data of the ego vehicle 110 and the sensor data of the remote vehicle 112. For example, the search module 206 determines an initial distance headway between the leading vehicle j (e.g., the remote vehicle 112) and the following vehicle i (e.g., the ego vehicle 110) based on the sensor data of the ego vehicle 110 and the remote vehicle 112. In a further example, the search module 206 determines an initial speed of the leading vehicle j and an initial speed of the following vehicle i based on the sensor data of the remote vehicle 112 and the ego vehicle 110, respectively.

In some embodiments, the search module 206 is operable to search the lookup table for a set of control gain values based on the initial vehicle state. The set of control gain values match the initial vehicle state. The set of control gain values are inputted into the consensus mechanism and used to tune the set of control gain variables of the consensus mechanism under the initial vehicle state.

The search of the lookup table is described below in more detail with reference to FIG. 5.

The implementation module 208 can be software including routines for implementing the consensus mechanism. In some embodiments, the implementation module 208 can be stored in the memory 127 of the computer system 200 and can be accessible and executable by the processor 125. The implementation module 208 may be adapted for cooperation and communication with the processor 125 and other components of the computer system 200 via a signal line 228.

In some embodiments, the implementation module 208 is operable to implement the consensus mechanism on the flow of vehicles based on the set of control gain values so that the behavior of the flow of vehicles is coordinated by the consensus mechanism. For example, the implementation module 208 implements the consensus mechanism to execute a longitudinal motion control on the flow of vehicles based on the set of control gain values so that the behavior of the flow of vehicles in the CACC application 115 is coordinated. In a further example, with the implementation of the consensus mechanism on the flow of vehicles, the vehicles in the flow follow one another with a harmonized speed and distance headway.

In some embodiments, an improved performance of the consensus mechanism is achieved based on the set of control gain values that match the initial vehicle state. For example, the improved performance of the consensus mechanism includes one or more of: a decreased convergence time of the consensus mechanism; and a decreased maximum jerk of the consensus mechanism. Other example improved performance is also possible.

Simulation results for the consensus mechanism under different simulation scenarios are shown below with reference to FIGS. 7A-7C.

Example Processes

Figure 3:
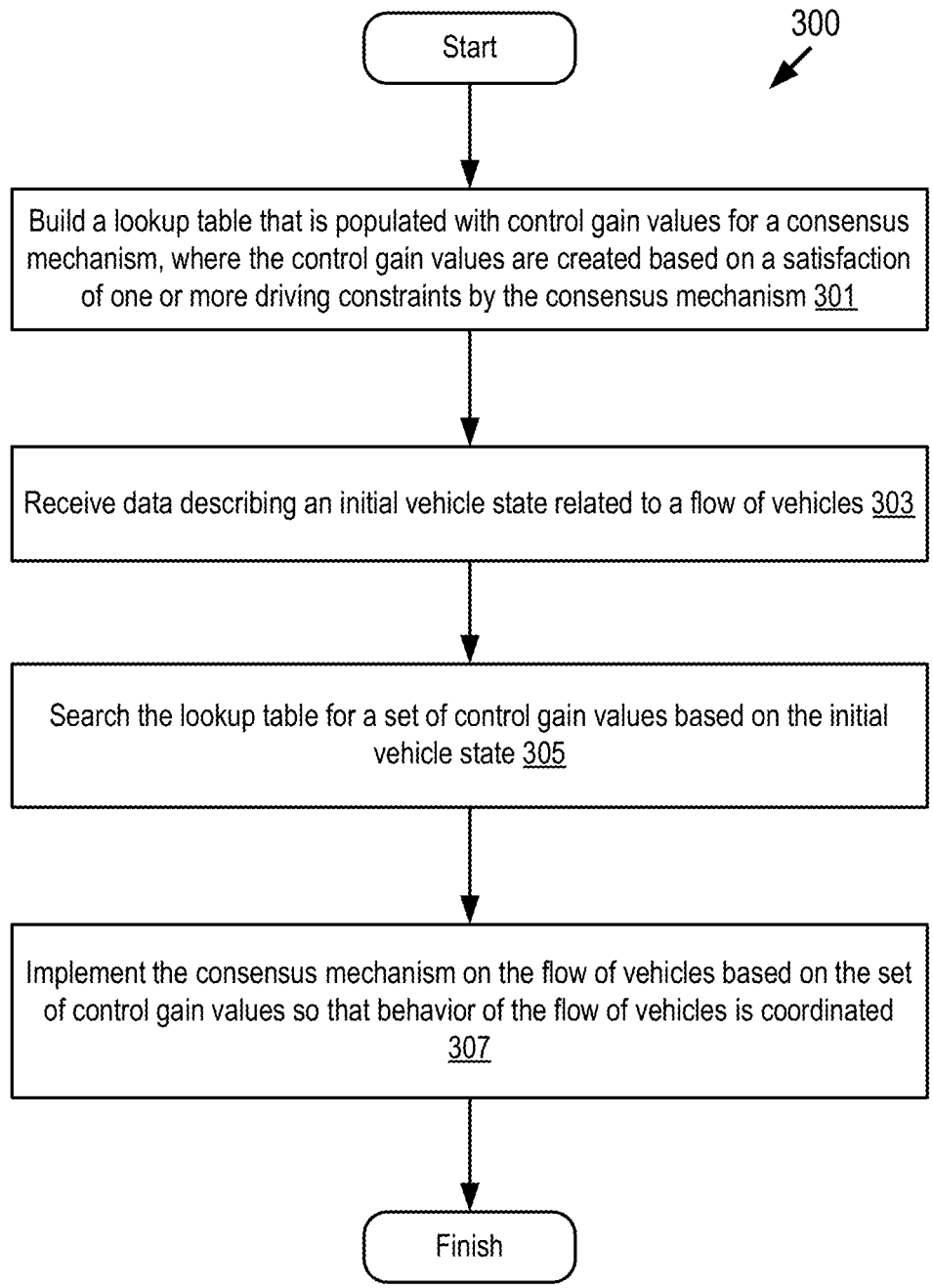
FIG. 3 depicts a method for providing a lookup table to improve performance of a consensus mechanism used in CAV technologies according to some embodiments.

Referring now to FIG. 3, depicted is a flowchart of an example method 300 for providing a lookup table to improve performance of a consensus mechanism used in CAV technologies according to some embodiments. The steps of the method 300 are executable in any order, and not necessarily the order depicted in FIG. 3.

At step 301, the creation module 204 builds a lookup table that is populated with control gain values for the consensus mechanism, where the control gain values are created based on a satisfaction of one or more driving constraints by the consensus mechanism.

At step 303, the search module 206 receives data describing an initial vehicle state related to a flow of vehicles.

At step 305, the search module 206 searches the lookup table for a set of control gain values based on the initial vehicle state.

At step 307, the implementation module 208 implements the consensus mechanism on the flow of vehicles based on the set of control gain values so that behavior of the flow of vehicles is coordinated.

For example, the consensus mechanism is configured to control the behavior of the flow of vehicles in the CACC application 115. The implementation module 208 implements the consensus mechanism to execute a longitudinal motion control on the flow of vehicles based on the set of control gain values so that the behavior of the flow of vehicles in the CACC application 115 is coordinated.

FIG. 4 depicts a flowchart 400 for building a lookup table according to some embodiments. The steps of the flowchart 400 are executable in any order, and not necessarily the order depicted in FIG. 4. The flowchart 400 shows an approach to create the lookup table that is used to find optimal values of control gain variables in terms of different initial vehicle states (e.g., different initial states of the leading vehicle j and the following vehicle i).

Given the second-order dynamics of vehicles as equation (1) and (2), the initial vehicle state of the following vehicle i and the leading vehicle j are $(r_i(t_0), v_i(t_0), a_i(t_0))$ and $(r_j$ $(t_0-\tau_{ij}(t_0))$, $v_j(t_0-\tau_{ij}(t_0))$, $a_j(t_0-\tau_{ij}(t_0)))$. Here, $t_0$ denotes an initial time step when the consensus mechanism is applied. In the above equation (6), the double-integrator consensus mechanism does not consider the acceleration of the leading vehicle, and the positions of vehicles are calculated as their distance difference. The initial vehicle state of the consensus mechanism can be simplified to $(\Delta r_{ij}(t_0), v_i(t_0), v_j(t_0-\tau_{ij}(t_0)))$, where $\Delta r_{ij}(t_0)=r_j(t_0-\tau_{ij}(t_0))-r_i(t_0)$. For example, the initial vehicle state is simplified to include an initial distance headway $\Delta r_{ij}(t_0)$ between the leading vehicle and the following vehicle, an initial speed $v_j(t_0-\tau_{ij}(t_0))$ of the leading vehicle j and an initial speed $v_i(t_0)$ of the following vehicle i.

When the consensus mechanism (e.g., shown in equation (6)) starts to run on the vehicle i, the control gain values of the control gain variables $k_{ij}$ and $\gamma_i$ can be set in real time with the initial vehicle state $(\Delta r_{ij}(t_0), v_i(t_0), v_j(t_0-\tau_{ij}(t_0)))$. The creation module 204 is operable to build a 3-dimension lookup table offline that covers all possible values of the initial vehicle states, and the optimal control gain values for the control gain variables can be picked from certain sets of candidates.

In some embodiments, each parameter in the initial vehicle state acts as one dimension of the lookup table. For example, the initial distance headway $\Delta r_{ij}(t_0)$, the initial speed $v_j(t_0-\tau_{ij}(t_0))$ of the leading vehicle and the initial speed $v_i(t_0)$ of the following vehicle act as a different dimension of the lookup table respectively, so that the lookup table has 3 dimensions. The lookup table is populated with control gain values for a set of control gain variables $k_{ij}$ and $\gamma_i$ under different initial vehicle states.

The creation module 204 builds the lookup table based on considerations of one or more driving constraints including a safety constraint, an efficiency constraint and a comfort constraint.

Firstly, the creation module 204 builds the lookup table so that a first priority of the consensus mechanism is to satisfy a safety constraint. The safety constraint is evaluated by a headway overshoot. An example factor considered by the creation module 204 when selecting or determining control gain values that enable the consensus mechanism to satisfy the safety constraint is the ego vehicle's headway overshoot relative to the leading vehicle. For example, a satisfaction of the safety constraint indicates that a distance headway requirement between the leading vehicle and the following vehicle in the flow of vehicles is met (e.g., there is no headway overshoot between the leading vehicle and the following vehicle).

For example, the headway overshoot influences the safety of the longitudinal motion control on the flow of vehicles. Since the consensus mechanism is operable to control the longitudinal motion of vehicles, overshoot of the longitudinal position may cause rear-end collision between two vehicles. Therefore, the following equation (7) needs to be satisfied to guarantee the safety of the longitudinal motion control:

$$r_j(t-\tau_{ij}(t))-r_i(t)>l_p, t\in[t_0,t_{consensus}], \quad (7)$$

where $t_{consensus}$ denotes a time step when consensus is reached. If the distance headway between the leading vehicle and the following vehicle is no greater than the length h of the leading vehicle, a rear-end collision occurs. Thus, the lookup table is populated with control gain values that guarantee no overshoot of the distance headway (e.g., control gain values that make the consensus mechanism to satisfy the equation (7)).

Secondly, the creation module 204 builds the lookup table so that a second priority of the consensus mechanism is to satisfy an efficiency constraint. The efficiency constraint is evaluated by a convergence time of the consensus mechanism. An example factor considered by the creation module 204 when selecting or determining control gain values that enable the consensus mechanism to satisfy the efficiency constraint is the convergence time (or convergence rate) of the consensus mechanism. For example, a satisfaction of the efficiency constraint indicates that a requirement on a convergence time of the consensus mechanism is met.

For example, the convergence rate of the consensus mechanism influences the efficiency of the longitudinal motion control on the flow of vehicles. If the convergence process takes a relatively long time, the traffic mobility and roadway capacity are highly affected during this process. Specifically, if the consensus mechanism is applied to control the longitudinal motion of ramp-merging vehicles, a slow convergence rate also introduces safety issues since consensus need to be reached before two vehicles merge with each other. Thus, the lookup table can be populated with control gain values that enable the consensus mechanism to have the least time "min $t_{consensus}$" to reach consensus after satisfying a safety condition shown in the above equation (7). Consensus is reached when the following equations (8)-(11) are satisfied:

$$|r_j(t_{consensus}-\tau_{ij}(t_{consensus}))-r_i(t_{consensus})|\leq \eta_r\cdot[l_j+r_i(t_{consensus})\cdot(t_{ij}^g(t_{consensus})+\tau_{ij}(t_{consensus}))] \quad (3)$$

$$|v_j(t_{consensus}-\tau_{ij}(t_{consensus}))-v_i(t_{consensus})|\leq \eta_v\cdot v_j(t_{consensus}-\tau_{ij}(t_{consensus})) \quad (4)$$

$$|a_i(t_{consensus})|\leq \delta_a \quad (5)$$

$$|jerk_i(t_{consensus})|\leq \delta_{jerk} \quad (6)$$

where $jerk_i$ is the derivative of vehicle i's acceleration or deceleration, $\eta_r$ and $\eta_v$ are proportional thresholds of the headway consensus and speed consensus, respectively, $\delta_a$ and $\delta_{jerk}$ are differential thresholds of acceleration and jerk consensus, respectively.

Thirdly, the creation module 204 builds the lookup table so that a third priority of the consensus mechanism is to satisfy a comfort constraint for a driver or passenger. The comfort constraint is evaluated by a maximum changing rate of the consensus mechanism. Example factors considered by the creation module 204 when determining control gain values to enable the consensus mechanism to satisfy the comfort constraint include a maximum acceleration, a maximum deceleration and a maximum jerk of the consensus mechanism. For example, a satisfaction of the comfort constraint indicates that a requirement on a maximum changing rate of the consensus mechanism is met.

For example, the maximum changing rate of the consensus mechanism can be defined as the maximum absolute value of acceleration, deceleration and jerk. The maximum changing rate influences the ride comfort of the longitudinal motion control. In this comfort constraint, the maximum absolute value of acceleration, deceleration and jerk matters, since a passenger or driver on the vehicle may expect a comfort ride with acceleration, deceleration and jerk being limited to certain intervals. The maximum changing rate of the consensus mechanism is evaluated by defining a parameter $\Omega$ as:

$$\Omega_i = \omega_1 \cdot \max_{t\in[t_0,t_{consensus}]}(|a_i^{max}(t)|, |d_i^{max}(t)|)+ \quad (7)$$

-continued $$\omega_2 \cdot \max_{t \in [t_0, t_{consensus}]} (|jerk_i^{max}(t)|, |jerk_i^{min}(t)|), t \in [t_0, t_{consensus}]$$

where $a_i^{max}$, $d_i^{max}$, $jerk_i^{max}$ and $jerk_i^{min}$ denote the maximum acceleration, maximum deceleration, maximum jerk and minimum jerk of vehicle i, respectively, and $\omega_1$ and $\omega_2$ are weighting parameters. The lookup table can be populated with control gain values that enable the consensus mechanism to achieve a minimum value of $\Omega$ in this equation (12).

Upon considering the above-described constraints, the flowchart 400 provides an approach to build a 3-dimension lookup table for choosing the control gain values. The set of $\Delta r_{ij}$ (the set of distance headways between vehicles j and i), represented as $\Pi_{\Delta r_{ij}}$, includes $\zeta 1$ elements. The set of $v_i$ (the set of the speeds of vehicle i), represented as $\Pi_{v_i}$, includes $\zeta 2$ elements. The set of $v_j$ (the set of the speeds of vehicle j), represented as $\Pi_{v_j}$, includes $\zeta 3$ elements. Thus, the size of this lookup table is $\zeta 1 \times \zeta 2 \times \zeta 3$. These three sets $\Pi_{\Delta r_{ij}}$, $\Pi_{v_i}$ and $\Pi_{v_j}$ are sorted set with ascending order. Each combination of these three parameters (e.g., the distance headway $\Delta r_{ij}$, the speed $v_i$, and the speed $v_j$), which may represent a different initial vehicle state, maps to an optimal value of k and an optimal value of $\gamma$ out of their sets $\Pi_\gamma$ and $\Pi_k$ respectively.

A brief description for the flowchart 400 is provided here. For each combination of the three parameters ($\Delta r_{ij}$, $v_i$, $v_j$), the creation module 204 runs the consensus mechanism in equation (6) for the particular combination of the three parameters (see lines 00-02 in the flowchart 400). Then, the creation module 204 finds a first subset of values for a first control gain variable k (denoted as $\Lambda_k$) and a first subset of values for a second control gain variable $\gamma$ (denoted as $\Delta_\gamma$) that enable the consensus mechanism to satisfy the safety constraint (see line 03).

If a specific initial vehicle state represented by the particular combination of the three parameters ($\Delta r_{ij}$, $v_i$, $v_j$) cannot satisfy the safety constraint (see line 04), no value for the control gain variables is generated. The consensus mechanism in equation (6) is considered as being not functional under that particular initial vehicle state (see line 05). Otherwise (see line 06), the creation module 204 finds a second subset of values for the first control gain variable k (denoted as $\Psi_k$, with $\Psi_k \subseteq \Lambda_k$) and a second subset of values for the second control gain variable $\gamma$ (denoted as $\Psi_\gamma$, with $\Psi_\gamma \subseteq \Lambda_\gamma$). The second subset $\Psi_k$ for k and the second subset $\Psi_\gamma$ for $\gamma$ enable the consensus mechanism to satisfy the efficiency constraint (see line 07).

If the second subset $\Psi_k$ and the second subset $\Psi_\gamma$ each only have one element, then the optimal value of k and the optimal value of $\gamma$ under this particular combination of the parameters ($\Delta r_{ij}$, $v_i$, $v_j$) are the only elements in $\Psi_k$ and $\Psi_\gamma$ respectively (see lines 08-09). Otherwise, the creation module 204 finds a third subset of values for the first control gain variable k (denoted as $\Phi_k$, with $\Phi_k \subseteq \Psi_k$) and a third subset of values for the second control gain variable $\gamma$ (denoted as $\Phi_\gamma$, with $\Phi_\gamma \subseteq \Psi_\gamma$). The third subset $\Phi_k$ for k and the third subset $\Phi_\gamma$ for $\gamma$ enable the consensus mechanism to satisfy the comfort constraint (see line 11).

If the third subset $\Phi_k$ and the third subset $\Phi_\gamma$ each only have one element, then the optimal values of k and $\gamma$ under this particular combination of the parameters ($\Delta r_{ij}$, $v_i$, $v_j$) are the only elements in the third subset $\Phi_k$ and the third subset $\Phi_\gamma$ respectively (see lines 12-13). Otherwise, the optimal value of k and the optimal value of $\gamma$ under this particular combination of the parameters ($\Delta r_{ij}$, $v_i$, $v_j$) are the minimum of the third subset $\Phi_k$ and the minimum of the third subset $\Phi_\gamma$, respectively (see line 15).

By repeating operations on lines 00-19 for each combination of the parameters ($\Delta r_{ij}$, $v_i$, $v_j$), the creation module 204 builds the 3-dimension lookup table with a size of $\zeta 1 \times \zeta 2 \times \zeta 3$.

FIG. 5 depicts a flowchart 500 for searching a lookup table in real time or near real time according to some embodiments. The steps of the flowchart 500 are executable in any order, and not necessarily the order depicted in FIG. 5.

In the flowchart 500, the search module 206 searches a lookup table for a set of control gain values based on an input initial vehicle state ($\Delta r_{ij}(t_0)$, $v_i(t_0)$, $v_j(t_0 - \tau_{ij}(t_0))$). It is noted that once the lookup table is generated, the lookup table may or may not have an initial vehicle state that is exactly the same as the input initial vehicle state.

When invalid values of the control gain variables are returned from the lookup table, the consensus mechanism in equation (6) is considered as being not functional under this particular initial vehicle state (see lines 02-04).

Otherwise, the search module 206 finds an initial vehicle state ($\Delta r_{ij\varepsilon 1}$, $v_{i\varepsilon 2}$, $v_{j\varepsilon 3}$) of the lookup table that matches the input initial vehicle state ($\Delta r_{ij}(t_0)$, $v_i(t_0)$, $v_j(t_0 - \tau_{ij}(t_0))$) (see lines 06-08). For example, each element in the matched initial vehicle state ($\Delta r_{ij\varepsilon 1}$, $v_{i\varepsilon 2}$, $v_{j\varepsilon 3}$) of the lookup table has a minimal distance to a corresponding element in the input initial vehicle state ($\Delta r_{ij}(t_0)$, $v_i(t_0)$, $v_j(t_0 - \tau_{ij}(t_0))$). That is, when compared to other initial vehicle states of the lookup table, the search module 206 finds the matched initial vehicle state ($\Delta r_{ij\varepsilon 1}$, $v_{i\varepsilon 2}$, $v_{j\varepsilon 3}$) of the lookup table that is closest to the input initial vehicle state ($\Delta r_{ij}(t_0)$, $v_i(t_0)$, $v_j(t_0 - \tau_{ij}(t_0))$). Then, the search module 206 retrieves a set of control gain values that correspond to the matched initial vehicle state ($\Delta r_{ij\varepsilon 1}$, $v_{i\varepsilon 2}$, $v_{j\varepsilon 3}$) from the lookup table. The set of control gain values can be used as values for the set of control gain variables of the consensus mechanism under the input initial vehicle state ($\Delta r_{ij}(t_0)$, $v_i(t_0)$, $v_j(t_0 - \tau_{ij}(t_0))$).

FIG. 6 is a graphical representation 600 illustrating a part of an example lookup table according to some embodiments. In the lookup table, a distance headway between a leading vehicle j and a following vehicle i has 21 values of −100 m, −90 m, −80 m, . . . , 80 m, 90 m and 100 m, respectively (e.g., $\Delta r_{ij}(t_0)$=[−100:10:100] m). The speed of the following vehicle i has 17 values of 2, 4, 6, 8, . . . , 34, respectively (e.g., $v_i(t_0)$=[2:2:34] m/s). The speed of the leading vehicle j has 17 values of 2, 4, 6, 8, . . . , 34, respectively (e.g., $v_j(t_0)$=[2:2:34] m/s). Then, the lookup table has a size of 21×17×17.

In this part of the lookup table shown in FIG. 6, the distance headway between the leading vehicle j and the following vehicle i is 60 m (e.g., $\Delta r_{ij}(t_0)$=60 m). This part of the lookup table shows different values for the control gain variable $k_{ij}$ under a set of initial vehicle states with $\Delta r_{ij}(t_0)$=60 m, $v_i(t_0)$=[2:2:34] m/s and $v_j(t_0)$=[2:2:34] m/s.

Figure 7C:
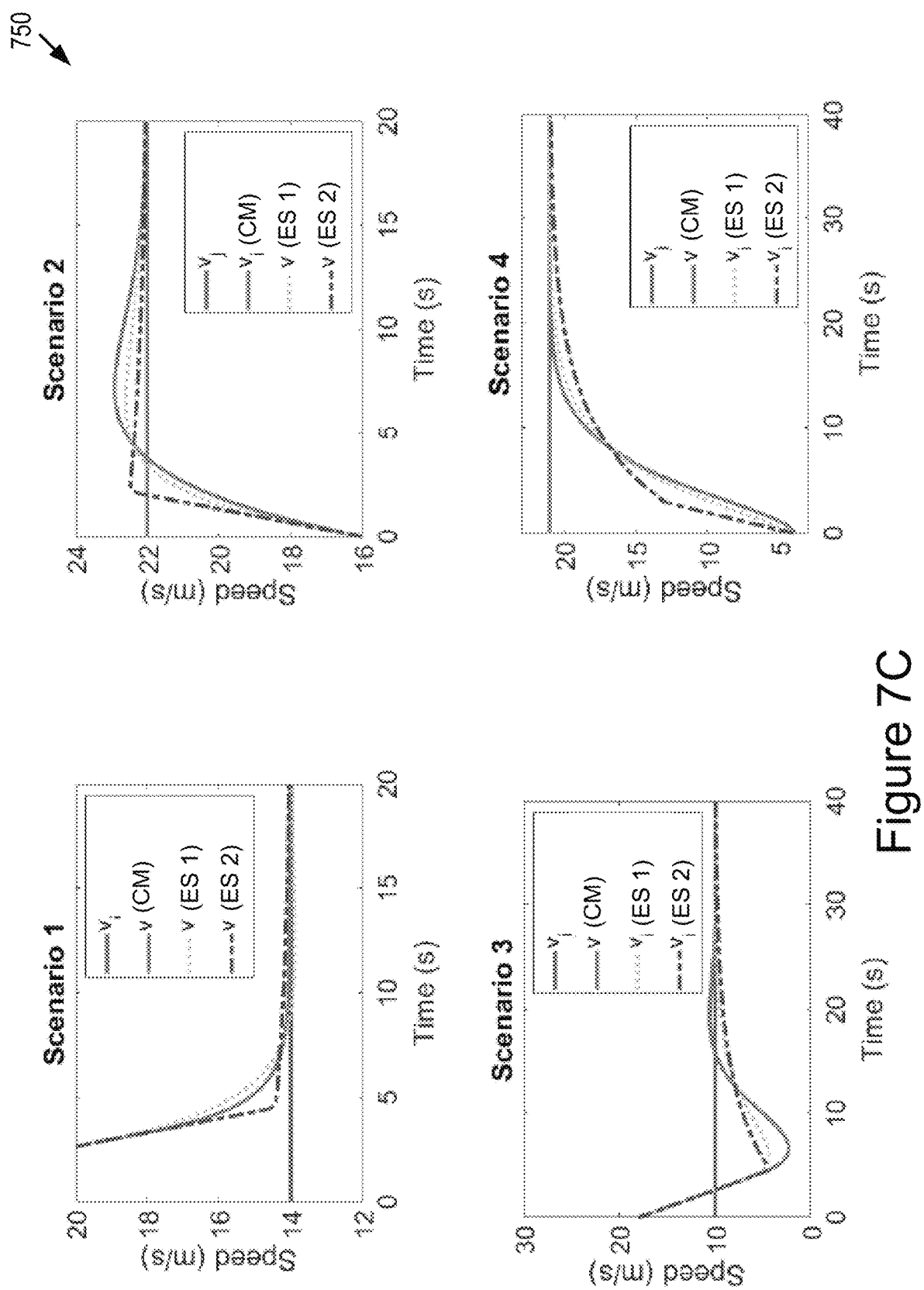

FIGS. 7A-7C are graphical representations 700, 730 and 750 illustrating simulations of a lookup table-based consensus mechanism according to some embodiments. Referring to FIG. 7A, simulations are conducted based on four scenarios with different initial vehicle states. As shown in Table 1, the initial distance headway $\Delta r_{ij}(t_0)$ between the leading vehicle j and the following vehicle i, an initial speed $v_j(t_0)$ of the leading vehicle j and an initial speed $v_i(t_0)$ of the following vehicle i are provided with different values for different scenarios.

The consensus mechanism provided herein for longitudinal motion control of a flow of vehicles is applicable for car-following cases on a same lane (e.g., platooning), where the following vehicle is physically behind the leading vehicle. Furthermore, the consensus mechanism can also be applied to ramp merging or intersection crossing cases, where the leading vehicle can be projected on the same lane as the following vehicle. Therefore, the initial distance headway between the leading vehicle and the following vehicle can be negative. As shown in FIG. 7A, the initial distance headway has a negative value in scenario 3 and scenario 4.

The parameters of the lookup table are set as: $\Pi_{\Delta r_{ij}} = \{-100, -90, \ldots, 100\}$ (m), $\Pi_{v_i} = \{2, 4, \ldots, 34\}$ (m/s), $\Pi_{v_j} = \{2, 4, \ldots, 34\}$ (m/s), $\Pi_\gamma = \{1, 2, \ldots 10\}$, k=0.1, $\xi 1=21$, $\xi 2=17$, $\xi 3=17$. The threshold parameters in the comfort constraint are set as $\eta_r = \eta_v = 0.05$, $\delta_a = 0.001$, $\delta_{jerk} = 0.005$. For the sake of simplicity while simulating the consensus mechanism shown in equation (6), assume that the communication delay $t_{ij}(t)$ has a constant value of 60 ms. The length of a vehicle is set $l_j = 5$ m, and the desired time gap $t_{ij}^g(t)$ is set as a constant value of 0.7 s. The consensus mechanism (CM) shown in equation (6) is compared with two existing solutions (existing solution 1 (ES 1) and existing solution 2 (ES 2)) as shown in FIGS. 7B-7C.

Speed trajectories of the leading vehicle and the following vehicle under different scenarios are shown in FIG. 7C, where each scenario has three different speed trajectories of the following vehicle's speed $v_i(t)$. The simulation results in terms of efficiency and comfort are shown in Table 2 of FIG. 7B. From FIG. 7B, it can be seen that the consensus mechanism described herein can intensively decrease a convergence time and a maximum jerk.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product that improves safety of a connected vehicle comprising a non-transitory memory of an onboard vehicle computer system of the connected vehicle that stores computer-executable code that, when executed by a processor, causes the processor to:
   build a lookup table that is populated with control gain values for a consensus mechanism, wherein the consensus mechanism is configured to control behavior of a flow of vehicles in a Cooperative Adaptive Cruise Control (CACC) application, wherein the control gain values are created based on a satisfaction of one or more driving constraints by the consensus mechanism;
   receive data describing an initial vehicle state related to the flow of vehicles;
   search the lookup table for a set of control gain values that match the initial vehicle state; and
   implement the consensus mechanism to execute a longitudinal motion control on the flow of vehicles based on the set of control gain values so that behavior of the flow of vehicles in the CACC application is coordinated, wherein coordinating the flow of vehicles includes maintaining a distance headway between the connected vehicle and other vehicles in the flow of vehicles.

2. The computer program product of claim 1, wherein the satisfaction of the one or more driving constraints includes a satisfaction of a safety constraint where a distance headway requirement between a leading vehicle and a following vehicle in the flow of vehicles is met.

3. The computer program product of claim 2, wherein the satisfaction of the one or more driving constraints further includes a satisfaction of an efficiency constraint where a requirement on a convergence time of the consensus mechanism is met.

4. The computer program product of claim 2, wherein the satisfaction of the one or more driving constraints further includes a satisfaction of a comfort constraint where a requirement on a maximum changing rate of the consensus mechanism is met.

5. A computer-implemented method that improves safety of a connected vehicle, comprising:
   building, with an electronic control unit of the connected vehicle, a lookup table that is populated with control gain values for a consensus mechanism, wherein the control gain values are created based on a satisfaction of one or more driving constraints by the consensus mechanism;
   receiving data describing an initial vehicle state related to a flow of vehicles;
   searching, with the electronic control unit, the lookup table for a set of control gain values based on the initial vehicle state; and
   implementing, with the electronic control unit, the consensus mechanism on the flow of vehicles based on the set of control gain values so that behavior of the flow of vehicles is coordinated, wherein coordinating the flow of vehicles includes maintaining a distance headway between the connected vehicle and other vehicles in the flow of vehicles.

6. The method of claim 5, wherein an improved performance of the consensus mechanism is achieved based on the set of control gain values that match the initial vehicle state.

7. The method of claim 6, wherein the improved performance of the consensus mechanism includes one or more of: a decreased convergence time of the consensus mechanism; or a decreased maximum jerk of the consensus mechanism.

8. The method of claim 5, wherein the satisfaction of the one or more driving constraints includes a satisfaction of a safety constraint where a distance headway requirement between a leading vehicle and a following vehicle in the flow of vehicles is met.

9. The method of claim 8, wherein the satisfaction of the one or more driving constraints further includes a satisfaction of an efficiency constraint where a requirement on a convergence time of the consensus mechanism is met.

10. The method of claim 8, wherein the satisfaction of the one or more driving constraints further includes a satisfaction of a comfort constraint where a requirement on a maximum changing rate of the consensus mechanism is met.

11. The method of claim 10, wherein the maximum changing rate relates to one or more of: a maximum acceleration; a maximum deceleration; or a maximum jerk.

12. The method of claim 8, wherein the initial vehicle state includes one or more of: an initial distance headway between the leading vehicle and the following vehicle; an initial speed of the leading vehicle; or an initial speed of the following vehicle.

13. A system that improves safety of a connected vehicle comprising:
an onboard vehicle computer system of the connected vehicle including a non-transitory memory storing computer code which, when executed by the onboard vehicle computer system, causes the onboard vehicle computer system to:
build a lookup table that is populated with control gain values for a consensus mechanism, wherein the control gain values are created based on a satisfaction of one or more driving constraints by the consensus mechanism;
receive data describing an initial vehicle state related to a flow of vehicles;
search the lookup table for a set of control gain values based on the initial vehicle state; and
implement the consensus mechanism on the flow of vehicles based on the set of control gain values so that behavior of the flow of vehicles is coordinated, wherein coordinating the flow of vehicles includes maintaining a distance headway between the connected vehicle and other vehicles in the flow of vehicles.

14. The system of claim 13, wherein an improved performance of the consensus mechanism is achieved based on the set of control gain values that match the initial vehicle state.

15. The system of claim 14, wherein the improved performance of the consensus mechanism includes one or more of: a decreased convergence time of the consensus mechanism; or a decreased maximum jerk of the consensus mechanism.

16. The system of claim 13, wherein the satisfaction of the one or more driving constraints includes a satisfaction of a safety constraint where a distance headway requirement between a leading vehicle and a following vehicle in the flow of vehicles is met.

17. The system of claim 16, wherein the satisfaction of the one or more driving constraints further includes a satisfaction of an efficiency constraint where a requirement on a convergence time of the consensus mechanism is met.

18. The system of claim 16, wherein the satisfaction of the one or more driving constraints further includes a satisfaction of a comfort constraint where a requirement on a maximum changing rate of the consensus mechanism is met.

19. The system of claim 18, wherein the maximum changing rate relates to one or more of: a maximum acceleration; a maximum deceleration; or a maximum jerk.

20. The system of claim 16, wherein the initial vehicle state includes one or more of: an initial distance headway between the leading vehicle and the following vehicle; an initial speed of the leading vehicle; or an initial speed of the following vehicle.

* * * * *